(12) United States Patent
Bouldin

(10) Patent No.: US 9,852,143 B2
(45) Date of Patent: Dec. 26, 2017

(54) ENABLING RANDOM ACCESS WITHIN OBJECTS IN ZIP ARCHIVES

(75) Inventor: Thomas Alan Bouldin, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/971,436

(22) Filed: Dec. 17, 2010

(65) Prior Publication Data
US 2012/0158676 A1 Jun. 21, 2012

(51) Int. Cl.
  G06F 7/00 (2006.01)
  G06F 17/00 (2006.01)
  G06F 17/30 (2006.01)
(52) U.S. Cl.
  CPC .............................. *G06F 17/30153* (2013.01)
(58) Field of Classification Search
  USPC .................................................. 707/673, 693
  See application file for complete search history.

(56) References Cited

U.S. PATENT DOCUMENTS

| 5,933,104 | A | 8/1999 | Kimura |
| 6,105,072 | A | 8/2000 | Fischer |
| 6,353,887 | B1 | 3/2002 | Cotugno et al. |
| 6,629,150 | B1 | 9/2003 | Huded |
| 6,650,261 | B2 | 11/2003 | Nelson et al. |
| 6,700,513 | B2 | 3/2004 | McGuire |
| 6,819,627 | B2 | 11/2004 | Obermaier et al. |
| 7,043,357 | B1 * | 5/2006 | Stankoulov et al. ......... 701/446 |
| 7,055,008 | B2 | 5/2006 | Niles et al. |
| 7,065,650 | B2 | 6/2006 | Collins et al. |
| 7,131,144 | B2 | 10/2006 | Rabin et al. |
| 7,162,499 | B2 | 1/2007 | Lees et al. |
| 7,383,205 | B1 | 6/2008 | Peinado et al. |
| 7,483,929 | B2 | 1/2009 | Kulkarni et al. |

(Continued)

FOREIGN PATENT DOCUMENTS

CN    1518706 A    8/2004

OTHER PUBLICATIONS

Robert; et al., "New Algorithms for Random Access Text Compression"—Published Date: Apr. 24, 2006 http://ieeexplore.ieee.org/xpls/abs_all.jsp?arnumber=1611578.

(Continued)

*Primary Examiner* — Muluembet Gurmu
(74) *Attorney, Agent, or Firm* — Cooper Legal Group, LLC

(57) ABSTRACT

Objects stored in a zip archive may be extracted in random-access fashion (without involving other objects stored in the zip archive) using the addresses of the objects stored in the central directory of the zip archive. However, zip archives often provide insufficient information to enable random access to the data within an object. This capability may be provided by segmenting the object into sections of a section size, and including in the zip archive a block table specifying, for respective sections, the block size of the corresponding block. A zip archive extractor may achieve random access to the object by using the block table to computing the addresses of blocks comprising the selected portion and extracting only those blocks. Backwards compatibility of the zip archive with other zip archive extractors may be preserved by including the block table within a zip extension of the central directory of the zip archive.

20 Claims, 9 Drawing Sheets

(56) References Cited

U.S. PATENT DOCUMENTS

| | | | |
|---|---|---|---|
| 7,509,354 B2 | 3/2009 | McGarvey | |
| 7,519,736 B2 | 4/2009 | Parham | |
| 7,574,744 B2 | 8/2009 | Eagle et al. | |
| 7,603,391 B1 | 10/2009 | Federwisch et al. | |
| 7,711,958 B2 | 5/2010 | Carro | |
| 7,814,499 B2 | 10/2010 | Straube et al. | |
| 7,925,749 B1 | 4/2011 | Lin et al. | |
| 7,933,924 B2 | 4/2011 | Karlsson et al. | |
| 2001/0038642 A1 | 11/2001 | Alvarez, II et al. | |
| 2002/0181027 A1* | 12/2002 | LaRocca et al. | 358/426.07 |
| 2003/0221105 A1 | 11/2003 | Bajaj | |
| 2004/0049485 A1 | 3/2004 | Obermaier et al. | |
| 2004/0210826 A1 | 10/2004 | Najork | |
| 2005/0041955 A1 | 2/2005 | Beuque | |
| 2005/0050332 A1 | 3/2005 | Serret-Avila et al. | |
| 2005/0097113 A1 | 5/2005 | Peterson | |
| 2006/0020645 A1 | 1/2006 | Hasegawa et al. | |
| 2006/0117307 A1 | 6/2006 | Averbuch et al. | |
| 2006/0136365 A1* | 6/2006 | Kedem et al. | 707/1 |
| 2006/0179087 A1 | 8/2006 | Fujii et al. | |
| 2006/0259448 A1 | 11/2006 | Yeo et al. | |
| 2007/0043782 A1* | 2/2007 | Basin et al. | 707/200 |
| 2007/0050424 A1* | 3/2007 | Basin et al. | 707/200 |
| 2007/0050431 A1 | 3/2007 | Vaidya et al. | |
| 2007/0220261 A1 | 9/2007 | Farrugia et al. | |
| 2007/0240147 A1 | 10/2007 | Bernabeu-Auban et al. | |
| 2008/0133928 A1 | 6/2008 | Torrubia et al. | |
| 2008/0173558 A1* | 7/2008 | Arvanitis | 206/232 |
| 2008/0229111 A1 | 9/2008 | Paya et al. | |
| 2009/0106549 A1 | 4/2009 | Mohamed | |
| 2009/0300642 A1 | 12/2009 | Thaler et al. | |
| 2010/0017424 A1 | 1/2010 | Hughes | |
| 2010/0185690 A1* | 7/2010 | Evans et al. | 707/803 |
| 2011/0029492 A1 | 2/2011 | Vella | |
| 2011/0218970 A1* | 9/2011 | Amit et al. | 707/679 |

OTHER PUBLICATIONS

Adiego; et al., "Lempel-Ziv compression of structured text"—Published Date: Aug. 24, 2004 http://ieeexplore.ieee.org/xpls/abs_all.jsp?arnumber=1611578.

Yiannis; et al., "Compression Techniques for Fast External Sorting"—Published Date: 2007 http://www.seg.rmit.edu.au/research/download.php?manuscript=175.

"Multi-part gzip file random access (in Java)"—Published Date: Aug. 4, 2009 http://www.developerit.com/2010/06/03/multi-part-gzip-file-random-access-(in-java).

Gailly; et al., "zlib 1.2.5 Manual"—Published Date: Apr. 19, 2010 http://www.zlib.net/manual.html.

Non-Final Office Action cited in U.S. Appl. No. 13/230,607 dated Jul. 18, 2013, 64 pgs.

Reply Non-Final Office Action cited in U.S. Appl. No. 13/230,607 dated Nov. 18, 2013, 19 pgs.

Final Office Action cited in U.S. Appl. No. 13/230,607 dated Mar. 7, 2014, 58 pgs.

Reply Final Office Action cited in U.S. Appl. No. 13/230,607 dated Jun. 9, 2014, 17 pgs.

Chinese Office Action cited in Chinese Application No. 201110423067.2 dated Jan. 20, 2014, 2 pgs.

Reply Chinese Office Action cited in Chinese Application No. 201110423067.2 dated Apr. 25, 2014, 10 pgs.

"An Analysis of XML Binary Formats and Compression", Christopher J. Auger!, Barr E. Mullins, Dursun A. Bulutoglu, Rusty O. Baldwin and Leemon C. Baird III, Jun. 13-14, 2007, Experimental Computer Science, reprinted from the Internet at: http://www.cs.huji.ac.il/~feit/exp/expcs07/papers/150.pdf, pp. 1-11.

"A Compressed Self-Indexed Representation of XML Documents", Nieves R. Brisaboa, Ana Cerdeira-Pena and Gonzalo Navarro, 2009, Proceedings of 13th European Conference on Research and Advanced Technology for Digital Libraries, pp. 273-284.

"eSign: An Enterprise Portal for Secure Document Management", Jiaohong Shi and Jinsong Ouyang, Aug. 2005, Proceedings: Information Reuse and Integration Conference, reprinted from the Internet at: http://ieeexplore.ieee.org/xpl/login.jsp?tp=&arnumber=1506520&url=http%3A%2F%2Fieeexplore.ieee.org%2Fstamp.stamp%2Cjps%3Ftp%3D%26arnumber%3D1506520, pp. 481-486.

"Integrity and Access Control in Untrusted Content Distribution Networks", Kevin E. Fu, Sep. 2005, reprinted from the Internet at: http://pdosnew.csail.mit.edu/papers/fu-phd-thesis.pdf, pp. 1-143.

"ECMA376-2: Open Packaging Conventions, section 12 Digital Signatures", Dec. 2006, reprinted from the Internet at: http://www.ecma-international.org/publications/files/ECMA-ST/Office Open XML 1st edition Part 2 (PDF). zip, Open Packaging Conventions, pp. 1-124.

"ZIP File Format Specification", Jun. 21, 2011, reprinted from the Internet at: http://www.pkware.com/documents/casestudies/APPNOTE.TXT, pp. 1-45.

A Model Driven Approach to Upgrade Package-Based Software Systems, Antonio Cicchetti, Davide Di Ruscio, Patrizio Pelieeccione, Alfonso Pierantonio and Stefano Zacchiroli, Nov. 2010, Communications in Computer and Information Science, reprinted from the Internet at: http://link.springer.com/chapter/10.1007%2F978-3-642-14819-4_19#page-1, pp. 262-276.

Non-Final Office Action cited in U.S. Appl. No. 13/230,607 dated Jun. 4, 2015, 63 pgs.

Chinese Notice of Allowance cited in Chinese Application No. 201110423067.2 dated May 20, 2015, 2 pgs.

Second Chinese Office Action cited in Chinese Application No. 201110423067.2 dated Jul. 16, 2014, 3 pgs.

Reply second Chinese Office Action cited in Chinese Application No. 201110423067.2 dated Sep. 16, 2014, 5 pgs.

Third Chinese Office Action cited in Chinese Application No. 201110423067.2 dated 1112412014, 3 pgs.

Reply third Chinese Office Action cited in Chinese Application No. 201110423067.2 dated Feb. 2, 2015, 4 pgs.

Non-Final Office Action cited in U.S. Appl. No. 13/230,607 dated Jun. 4, 2015, 28 pgs.

Reply Non-Final Office Action cited in U.S. Appl. No. 13/230,607 dated Nov. 4, 2015, 23 pgs.

Final Office Action cited in U.S. Appl. No. 13/230,607 dated Mar. 10, 2016, 35 pgs.

Reply Final Office Action cited in U.S. Appl. No. 13/230,607 dated Oct. 11, 2016, 24 pgs.

Non-Final Office Action cited in U.S. Appl. No. 13/230,607 dated Mar. 9, 2017, 41 pgs.

* cited by examiner

ENABLING RANDOM ACCESS WITHIN OBJECTS IN ZIP ARCHIVES

BACKGROUND

Within the field of computing, many scenarios involve a storage of objects compressed within a zip archive using a compression technique. The zip archive comprises a concatenation of the compressed versions of the objects, each preceded by a local header describing the object (e.g., the filename, the compression technique selected for the object, and the compressed size), and concludes with a central directory including a set of centralized headers that identify the addresses of the local headers. In order to extract an object from the zip archive, a zip archive extractor may read the central directory, identify the address within the zip archive of the local header of the object, seek within the zip archive to the address of the compressed data, and apply the compression technique to expand the compressed object. In this manner, the zip archive extractor is capable of providing random access to the objects stored in the zip archive; e.g., accessing a particular object in the zip archive does not involve the other objects in the zip archive.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The format of the zip archive promotes random access to particular objects within a particular zip archive. However, the format of the zip archive does not enable random access within a particular object stored in the zip archive, but only permits sequential access within the compressed data. For example, a zip archive extractor may be capable of extracting a particular object without extracting other objects, but often cannot access a particular portion of the object that does not begin at the beginning of the object. This incapacity may be disadvantageous in some scenarios. For example, a media object may be stored in a compressed manner in a zip archive, and a media rendering application, such as a streaming media application, may endeavor to seek within the zip archive to a particular location within the media object (e.g., a particular timecode or frame of a video recording, or a particular track of an album recorded as a single object). However, because different portions of an object are compressed with a variable compression ratio (based on the regularity of the data included in the portion), the zip archive extractor may be unable to identify the location of the selected portion within the compressed version of the object in the zip archive. Rather, the zip archive extractor may have to expand the compressed data of the object sequentially until reaching the selected portion. The lack of information about the compression of an object therefore comprises inefficiency when a zip archive extractor is invoked to access a randomly selected portion of an object stored in a zip archive.

Presented herein are techniques for enabling random access within objects stored in a zip archive. In accordance with these techniques, for an object to be compressed into a zip archive, an embodiment of these techniques may first select a section size that, within the uncompressed version of the object, defines periodic locations into which a random seek may be sought. For example, if the section size is defined as 64 kilobytes, a zip archive extractor may be capable of randomly seeking to any 64-kilobyte boundary within the object while the object remains compressed. This selection therefore conceptually segments the object into a sequence of sections of a fixed size. A zip archive generator may, while invoking a compression technique to compress the object, record the sizes of the compressed blocks of data corresponding to each section. The zip archive generator may then store within the zip archive a block table that indicates, for respective objects, a sequence of block sizes of the blocks comprising the compressed version of the object.

When a request is received to access a selected portion of the object, a zip archive extractor may identify the uncompressed section of the object where the selected portion begins. The zip archive extractor may then examine the block table to identify the block sizes of the blocks leading up to the block corresponding to the selected portion. The zip archive extractor may then read this block (and any subsequent blocks corresponding to other sections of the compressed object that also include the portion) and may invoke the compression technique to expand these blocks. The sections extracted in this manner may be trimmed to match the designated portion of the object, and the uncompressed data may be provided in response to the request. In this manner, random access to arbitrarily selected portions of the object may be enabled. Moreover, this functionality may be added while preserving backwards compatibility of the zip archive (e.g., the capability of the zip archive to be properly interpreted by zip archive generators and zip archive extractors that do not support this feature) by storing the block table in a zip extension of the zip archive. For example, if the block table is included in a zip extension of the central directory of a zip archive, zip archive extractors that support this feature may read and utilize the block table to provide random access to the objects contained therein, while zip archive extractors that do not support this feature may disregard the unusable zip extension, and may otherwise be able to utilize the zip archive. In this manner, the capability of randomly accessing the contents of objects stored in the zip archive may be provided without diminishing the backwards compatibility of the zip archive.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
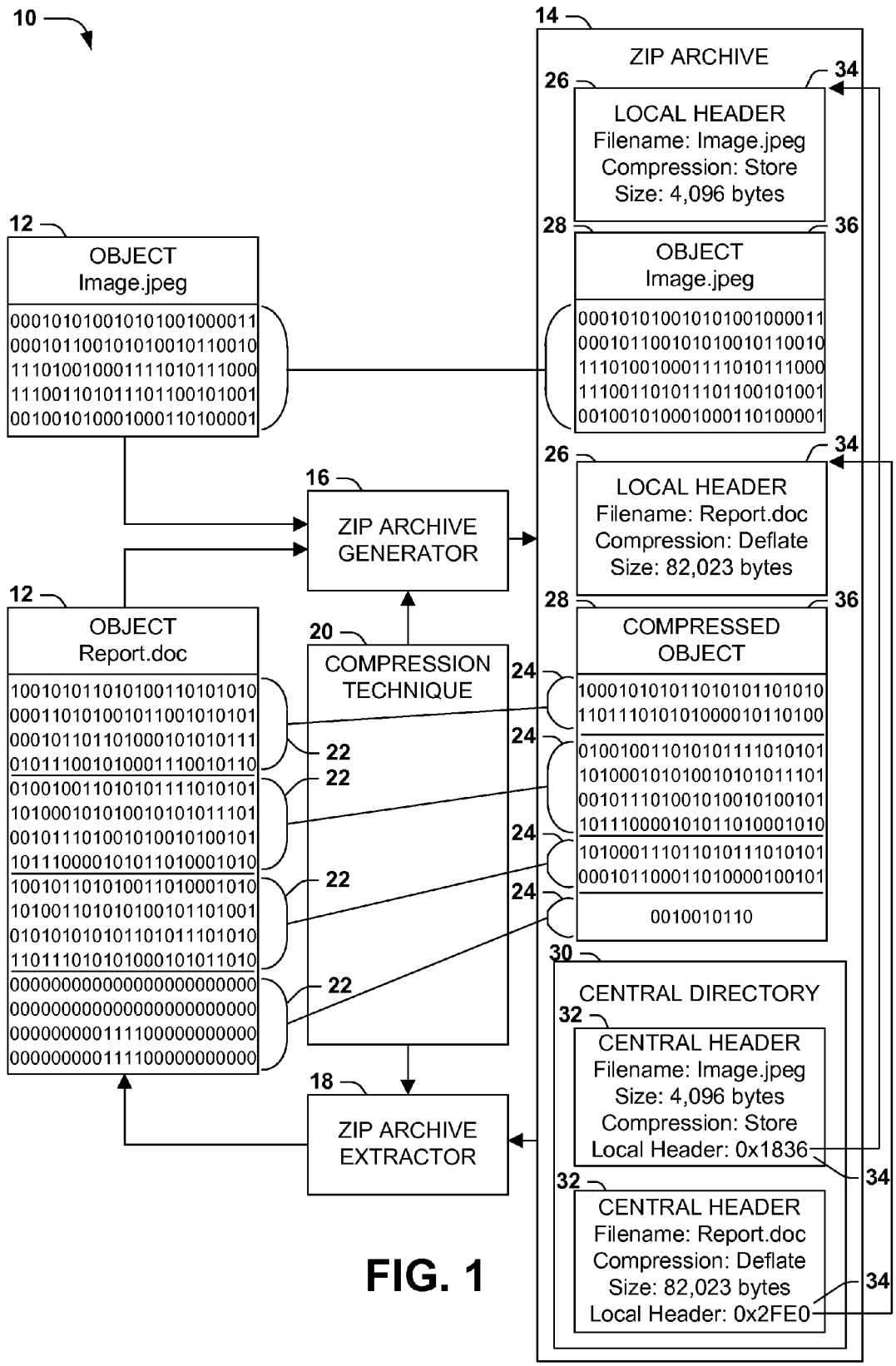
FIG. 1 is an illustration of an exemplary scenario featuring a set of objects stored in and/or extracted from a zip archive.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the generation of a zip archive, comprising a set of objects compressed according to one or more compression techniques. A user or process may designate a set of objects and invoke a zip archive generator, which may examine respective objects, select a suitable compression technique based on the nature of the object, and invoke the compression technique to generate a compressed version of the object. For some objects (e.g., those comprising data that has already been compressed), the use of any additional compression technique may achieve insubstantial or negative compression and at the expense of unfruitful computation, so the object may be stored in the archive in an uncompressed state. The zip archive generator generates the zip archive, comprising, for respective objects, a local header (describing the object and the compression technique utilized) and the compressed object, and concluding with a central directory, comprising a set of central headers that again describe the objects contained in the zip archive, including the addresses of the local headers of the objects and the compression technique used for each object (or the lack of a compression technique for objects that are stored in the zip archive in an uncompressed state).

A compressed object may be extracted from a zip archive by a zip archive extractor in the following manner. First, the zip archive extractor reads the central directory to identify the address of the local header of the object within the zip archive, the compressed size of the object, and the compression technique utilized to store the object in the zip archive. The zip archive extractor then seeks to the local header and reads the contents of the local header in order to advance to the address where the compressed data for the object begins. The zip archive extractor may then read the compressed data for the object, and may invoke the compression technique on the compressed data to regenerate the uncompressed object. In this manner, and due to the identifiable location of the central directory within the zip archive that specifies the locations of the local headers of the objects included in the zip archive, the format of the zip archive enables a zip archive extractor to extract a single object or a subset of objects without having to examine or extract the other objects of the zip archive.

FIG. 1 presents an illustration of an exemplary scenario 10 featuring a first object 12 ("Report.doc") and a second object 12 ("Image.jpeg") to be stored in a zip archive. To each object 12, a zip archive generator 16 may apply a compression technique 20 to generate a compressed object 28, and may store the compressed objects 28 in the zip archive 14. Each object 12 may include data formatted in a particular manner that may affect the compression thereof. For example, the data comprising the first object 12 may be comparatively uncompressed, such that applying a compression technique 20 to the first object 12 may result in a compressed object 28 of a significantly smaller size. However, the data of the second object 12 may already be compressed, such that applying a compression technique 20 to the second object 12 may generate a compressed object 28 that is not significantly smaller (or may even be larger than the uncompressed object due to the overhead of the compression technique 20), yet that can only be utilized by expanding it to regenerate the second object 12, thereby consuming computational resources without significant benefit. Accordingly, for the first object 12, the zip archive generator 16 may store the compressed object 28 in the zip archive 14, but for the second object 12, the zip archive generator 16 may instead store the second object 12 in an uncompressed format. Moreover, the zip archive generator 16 may utilize a variety of compression techniques 20, each of which may be adept at compressing a particular type of data, and may select an appropriate compression technique for each object 12 based on the nature of the data contained therein.

In order to generate a zip archive 14, the zip archive compressor 16 stores a sequence of compressed objects 28, each preceded by a local header 26 that describes various properties of the compressed object 28, e.g., the filename of the object 12 (optionally including a location of the object 12 within the archived set of objects 12, such as a folder or subfolder where the object 12 is to be located upon expansion), the compression technique 20 used to generate the compressed object 28, and the compressed size of the object 12. Additionally, the zip archive compressor 16 appends to the sequence of compressed objects 28 a central directory 30, comprising a sequence of central headers 32, each again describing the compressed object 28 and the address of the local header 26 within the zip archive 16. Conversely, in order to extract a particular object 12 from a zip archive 14, a zip archive extractor 18 examines the central directory 30 and locates the central header 32 for the object 12. The zip archive extractor 18 then seeks to a local header address 34 of the local header 26 for the compressed object 28 and advances past the local header 26 to a start address 36, where the data comprising the compressed object 28 begins. The zip archive extractor 18 then invokes the compressor technique 20 to expand the compressed object 28 in order to regenerate the object 12. In this manner, the zip archive generator 16 and the zip archive extractor 18 interoperate to achieve the compression of objects 12 in a zip archive 14 and the extraction therefrom.

A particular advantage to the techniques presented in the exemplary scenario 10 of FIG. 1 involves the capability of the zip archive extractor 18 to achieve random access to the compressed objects 28 stored in a zip archive 14. For example, the first compressed object 28 is stored after the second compressed object 28 in the zip archive 14, but in order to extract the first object 12, the zip archive extractor 18 does not have to examine or extract the second compressed object 28. By referring to the central header 32 for the first compressed object 28 stored in the central directory 30, the zip archive extractor 18 may identify the local header address 34 for the first compressed object and may directly seek within the zip archive 14 to this local header address 34. This configuration may be advantageous, e.g., in order to enable rapid access in the same manner to any object 12 stored in the zip archive 14, regardless of where and how the compressed object 28 is stored within the zip archive 14, and regardless of the numbers and sizes of compressed objects 28 stored before and after the compressed object 28. Because zip archives 14 may scale up to contain many objects 12, and/or may contain very large compressed objects 28 (perhaps spanning into several gigabytes), the capability of random access to any compressed object 28 without regard to the other compressed objects 28 in the zip archive 14 may significantly improve the efficiency of the zip archive extractor 18.

However, the capability of random access to an object 12 stored in a zip archive 14 does not include the capability of random access within the object 12, but may only include sufficient information to permit sequential access to the data comprising the compressed object 28. While the information contained in the central directory 30 of the zip archive 14 enables the zip archive extractor 18 to identify, rapidly and efficiently, a start address 36 of the data comprising a compressed object 28, this information does not enable the zip archive extractor 18 to seek within the zip archive 14 to an address corresponding to a particular location within the compressed object 28 in order to extract a particular portion of the object 12. Moreover, the zip archive extractor 18 may not be capable of inferring or calculating the address due to the variable compression rate of the compression technique 20. For a particular object 12, different sections 22 of the object 12 may compress with different degrees of compaction, each resulting in a block 24 of compressed data having a variable block sizes. For example, in the exemplary scenario 10 of FIG. 1, the first object 12 may comprise four sections 22 of data having a uniform size. However, each section 22 may be compressed by the compression technique 20 into a block 24 having a variable block size; e.g., the first section 22 may compress into a first block 24 with a modest compression ratio of 50%, while the second section 22 may not compress at all and may result in a second block 24 with a 0% compression ratio (e.g., having a block size equaling the section size of the second section 22). Conversely, a fourth section 22, comprising data of a highly uniform pattern, may compress tightly into a fourth block 22 having an 89% compression ratio. While the variable sizes of the blocks 22 results in a high degree of compression, these variable sizes also prevent a zip archive extractor 18 from inferring or calculating the location of a particular block 22 within the compressed object 28 corresponding to a particular section 22 of the object 12.

The inability to achieve random access of a selected portion of a compressed object 28 may cause significant disadvantages for a compression technique 20. As a first example, if only a small portion of the compressed object 28 is desired (e.g., an object 12 stored within a first zip archive 14 that is in turn stored in a second zip archive 14), the zip archive extractor 18 may have to extract the entire compressed object 28 from the zip archive 14 and extract the selected portion therefrom. This process is inefficient, and may involve a significant amount of computing resources, e.g., if the selected portion is only a small portion of the compressed object 28. As a second example, the zip archive 18 may be invoked by a streaming process that provides a data stream of the data comprising an object 12, e.g., a video recording having key frames, which may be stored within the zip archive 14. However, the streaming process may not be able to access a desired portion of the compressed object 28 within the zip archive 14 on a random-access basis, but may instead have to invoke the zip archive extractor 18 to extract the entire compressed object 28 up to the desired location of data to be streamed. This inefficiency may arise repeatedly, e.g., where the streaming process involves a series of requests to access a sequence of particular portions within the compressed object 28.

Presented herein are techniques for storing objects 12 within a zip archive 14 that enables a zip archive extractor 18 to achieve random access to a desired portion of data stored within a compressed object 28 by including information within the zip archive 14 that enables a zip archive extractor 18 to calculate, within a compressed object 28, the address of a block 24 corresponding to a particular section 22. In order to achieve this capability, the zip archive generator 16 segments the object 12 into regularly sized sections 22 of a section size 42 (e.g., eight-kilobytes sections 22). The zip archive generator 16 may then track the block sizes of blocks 24 generated by the compression technique 20 and corresponding to such sections 22, and may store this information within the zip archive 14 as a block table 44, comprising a list of the block sizes of the blocks 24. A zip archive extractor 18 may then utilize this information to calculate, within a compressed object 28, the address of a block 24 corresponding to any section 22 of the object 12. The zip archive 18 may seek within the zip archive 14 to this address, extract only this block 24, and invoke the compression technique 20 to expand the block 24 to regenerate the section 22. In this manner, the configuration of the zip archive generator 16 to generate and store a block table for one or more compressed objects 28 enables the zip archive extractor 18 to extract any particular block 24 of a compressed object 28 without regard to the other blocks 24 of the compressed object 28, thereby achieving random access into the compressed object 28.

Figure 2:
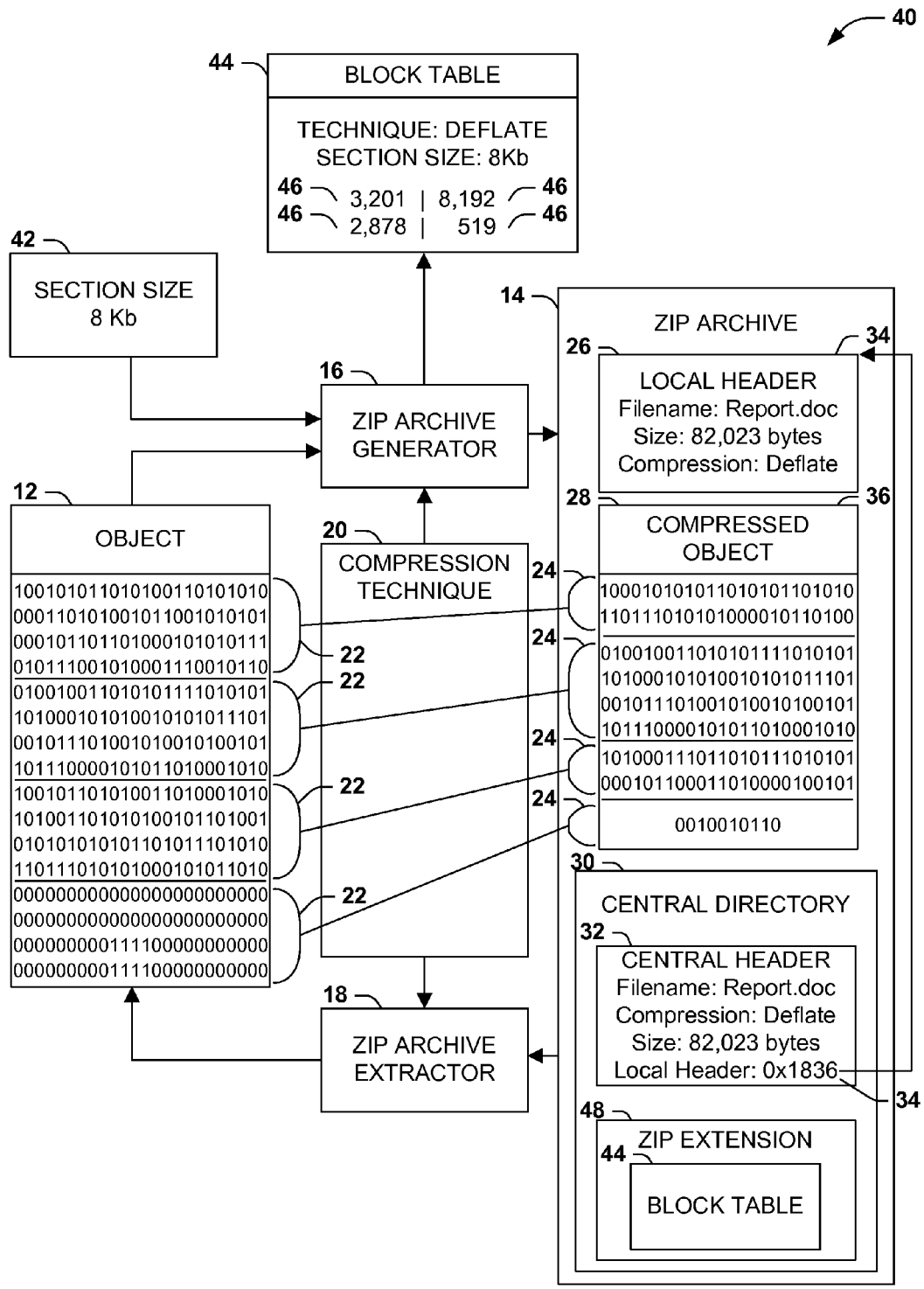
FIG. 2 is an illustration of an exemplary scenario featuring a set of objects stored in and/or extracted from a zip archive having a block table in accordance with the techniques presented herein.

FIG. 2 presents an illustration 40 of an exemplary scenario featuring an application of these techniques to achieve random access into a particular portion of a compressed object 28 stored in a zip archive 14. In this exemplary scenario 40, a zip archive generator 16 may be invoked to generate a zip archive 14 storing a compressed version of an object 12, and may invoke a compression technique 20 to compress the object 12. However, in this exemplary scenario 40, the zip archive generator 16 also identifies a section size 42 specifying the sizes of sections 22 within the object 12. While invoking the compression technique 20 compress the object 12, the zip archive generator 16 may record the block sizes of the blocks 24 corresponding to each section 22. The zip archive generator 16 may therefore generate a block table 44, comprising a sequence of block sizes 46 for respective blocks 24 of the compressed object 28, along with some additional information, such as the compression technique 20 used to compress the blocks 24 and the section size 42 of each section 22 corresponding to a block 24. The zip archive generator 16 may store include the block table 44 in the zip archive 14. A zip archive extractor 18 may utilize the block table 44 to identify, within the compressed object 28, the address of a particular block 24 corresponding to a particular section 22 of the object 12. For example, in order to access the fourth section 22 of the object 12 in the zip archive 14, the zip archive extractor 18 reads the central directory 30, locates the central header 32 for the compressed object 28, and reads from the central header 32 the local header address 34 of the compressed object 28. The zip archive extractor 18 then seeks to the local header address 34 of the local header 26 of the compressed object 28 and advances past the local header 26 to the start address 36 of the compressed data for the compressed object 28. However, instead of accessing the compressed data sequentially, the zip archive extractor 18 may refer to the block table 44 to identify the block sizes 46 of the blocks 24 preceding the fourth block 24. For example, the zip archive extractor 18 may simply add the block sizes 46 of the first three blocks 24 preceding the fourth block 24, arriving at a total block size for these preceding blocks 24 of 14,271 bytes. The zip archive extractor 18 may then advance from the starting address of the compressed data to this location, which represents the beginning of the fourth block 24. The zip archive extractor 18 may then extract the fourth block 24 and invoke the compression technique 20 to expand the fourth block 24, thereby regenerating the fourth section 22. In this manner, the zip archive extractor 18 may utilize the block table 44 generated by the zip archive generator 16 to achieve random access into the sections 22 of an object 12 stored in the zip archive 14 in accordance with the techniques presented herein.

As further illustrated in the exemplary scenario 40 of FIG. 2, the block table 44 may be stored in the zip archive 14 within a zip extension, comprising an extra set of information added to the zip archive 14 that may be utilized by some zip archive generators 16 and/or zip archive extractors 18 in order to enable additional features, but that other zip archive generators 16 and/or zip archive extractors 18 may disregard without affecting the capability to extract objects 12 from the zip archive 14. The zip archive format, having been first implemented over two decades ago, has been considerably improved in many ways to enable new features such as additional compression types and the encryption of compressed objects 28 (e.g., using a password as a symmetric encryption key) as well as the names, types, and structure of the compressed objects 28 contained in the zip archive 14. However, the ubiquity of zip archives in the computing world has resulted in a wide variety of zip archive generators 16 and zip archive extractors 18 provided on many platforms. Therefore, it is desirable to implement improvements of the zip archive in a backwards-compatible manner, such that a zip archive 14 including a contemporary improvement may nevertheless be correctly parsed by preceding generations of zip archive generators 16 and zip archive extractors 18. In order to enable such improvements without compromising the backwards compatibility of the zip archive format, zip extensions 48 may be appended to local headers 26, central headers 32, and/or the central directory 30 following the central headers 32. The data of a zip extension 48 begins with two alphanumeric characters comprising a type identifier of the zip extension (e.g., an indication of the nature and use of the data contained in the zip extension), and zip archive generators 16 and/or zip archive extractors 18 that do not recognize the type identifier may disregard the zip extension 48.

Accordingly, in the exemplary scenario 40 of FIG. 2, the block table 44 is included in the zip archive 14 within a zip extension 48 appended to the central directory 30. Zip archive generators 16 and/or zip archive extractors 18 configured according to the techniques presented herein may recognize the type identifier of the zip extension 48, and may therefore parse and utilize the block table 44 contained therein, while, zip archive generators 16 and/or zip archive extractors 18 that are not configured according to the techniques presented herein may recognize the type identifier of the zip extension 48, and may therefore disregard the block table 44 without losing the capability of compressing and/or expanding the zip archive 14. In this manner, the block table 44 may be included in the zip archive 14 in a manner that maintains backwards-compatibility of the zip archive 14 with zip archive generators 16 and zip archive extractors 18 that are not configured according to the techniques presented herein. However, other techniques may also be utilized to include the block table 44 in the zip archive 14 while maintaining backwards compatibility. As one such example, the block table 44 may be represented as a stored object having a reserved filename that indicates the nature of the object, such that zip archive extractors 18 that are configured according to this technique may recognize the block table 44 by its reserved name and utilize it accordingly, while other zip archive extractors 18 may simply extract is as an extraneous object included in the archive.

Figure 3:
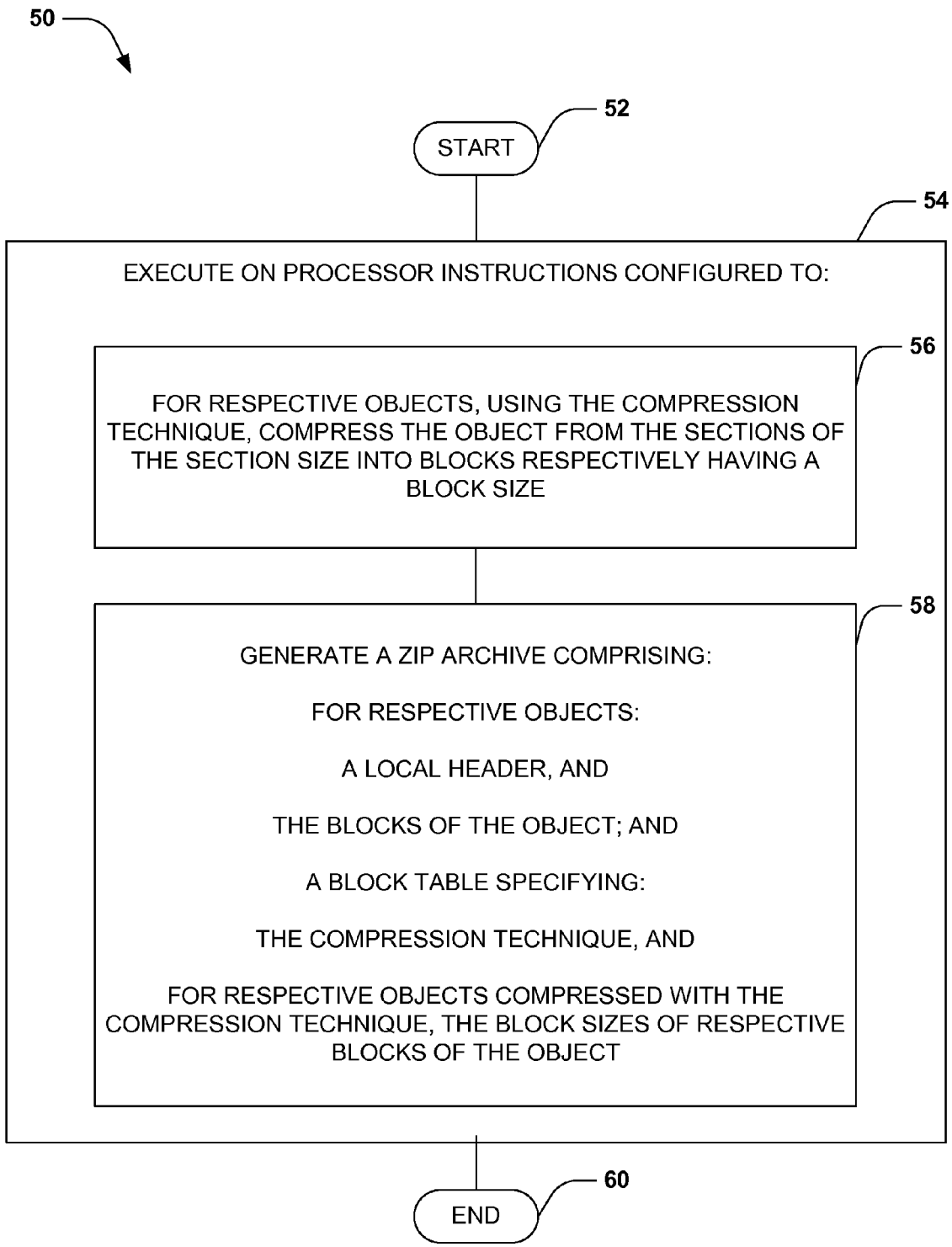
FIG. 3 is a flow chart illustrating an exemplary method of generating a zip archive compressing at least one object in accordance with the techniques presented herein.

FIG. 3 presents a first embodiment of these techniques, illustrated as an exemplary method 50 of generating a zip archive 14 compressing at least one object 12 comprising sections 22 of a section size 42. The exemplary method 50 may be implemented, e.g., as a set of software instructions stored in a memory component (e.g., a system memory circuit, a platter of a hard disk drive, a solid state storage device, or a magnetic or optical disc) of a device having a processor and a compression technique 20, that, when executed by the processor of the device, cause the processor to perform the techniques presented herein. The exemplary method 50 begins at 52 and involves executing 54 the instructions on the processor. More specifically, the instructions are configured to, for respective objects 12, using the compression technique 20, compress 56 the object 12 from the sections 22 of the section size 42 into blocks 24 respectively having a block size 44. The instructions are also configured to generate 58 a zip archive 14 comprising, for respective objects 12 stored in the zip archive 14, a local header 26 and the blocks 24 of the object 12; and a block table 44 specifying the compression technique 20 and, for respective objects 12 compressed with the compression technique 20, the block sizes 44 of respective blocks 24 of the compressed object 28. In this manner, the exemplary method 50 of FIG. 3 causes the processor of the device to compress the objects 12 into zip archive 14 that enables random access within the objects 12 stored therein, and so ends at 60.

Figure 4:
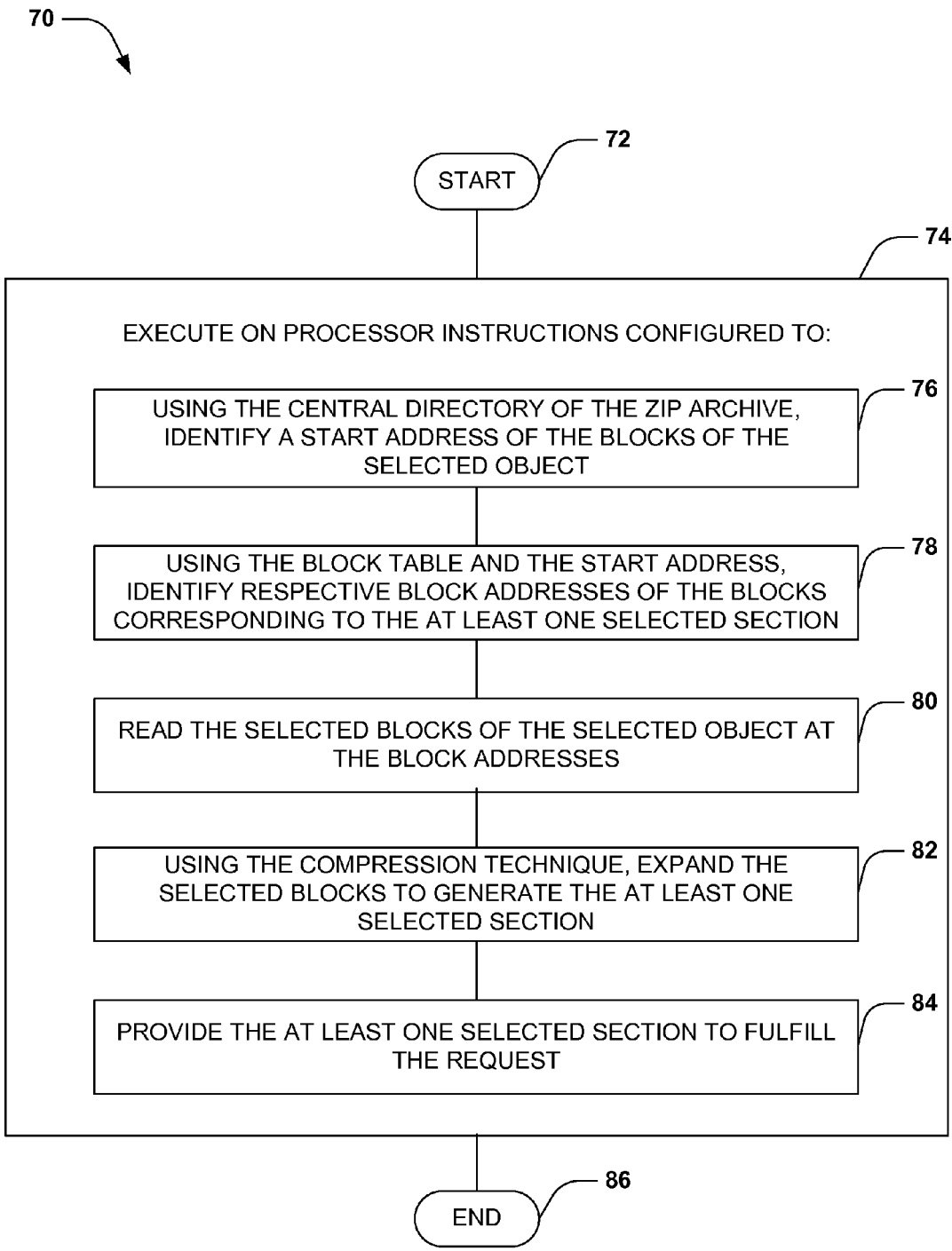
FIG. 4 is a flow chart illustrating an exemplary method of extracting a selected portion of at least one selected object from a zip archive having a block table in accordance with the techniques presented herein.

FIG. 4 presents a second embodiment of these techniques, illustrated as an exemplary method 70 of fulfilling a request to read at least one selected section 22 of a selected object 12 stored in a zip archive 14. The selected object 12 may have been compressed with a compression technique 20, wherein particular sections 2 of the object 12, having a section size 42, are stored as blocks 24 respectively having a block size 46. Moreover, this exemplary method 70 may be applied to a zip archive 14 having a block table 44 specifying a block size 46 for respective blocks 24 of at least one object 22 stored within the zip archive 14. The exemplary method 70 may be implemented, e.g., as a set of software instructions stored in a memory component (e.g., a system memory circuit, a platter of a hard disk drive, a solid state storage device, or a magnetic or optical disc) of a device having a processor and a compression technique 20, that, when executed by the processor of the device, cause the processor to perform the techniques presented herein. The exemplary method 70 begins at 72 and involves executing 74 the instructions on the processor. More specifically, the instructions are configured to, using a central directory 30 of the zip archive 14, identify 76 a start address 36 of the blocks 24 of the selected object 12. The instructions are also configured to, using the block table 44 and the start address 36, identify 78 respective block addresses of the blocks 24 corresponding to the selected sections 22. The instructions are also configured to read 80 the selected blocks 24 of the compressed object 28 at the block addresses. The instructions are also configured to, using the compression technique 20, expand 82 the selected blocks 24 to generate the at least one selected section 22. The instructions are also configured to provide 84 the at least one selected section 22 to fulfill the request. In this manner, the exemplary method 70 achieves random access into a compressed object 28 stored in the zip archive 14 to retrieve a selected portion of the object 12 in accordance with the techniques presented herein, and so ends at 86.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
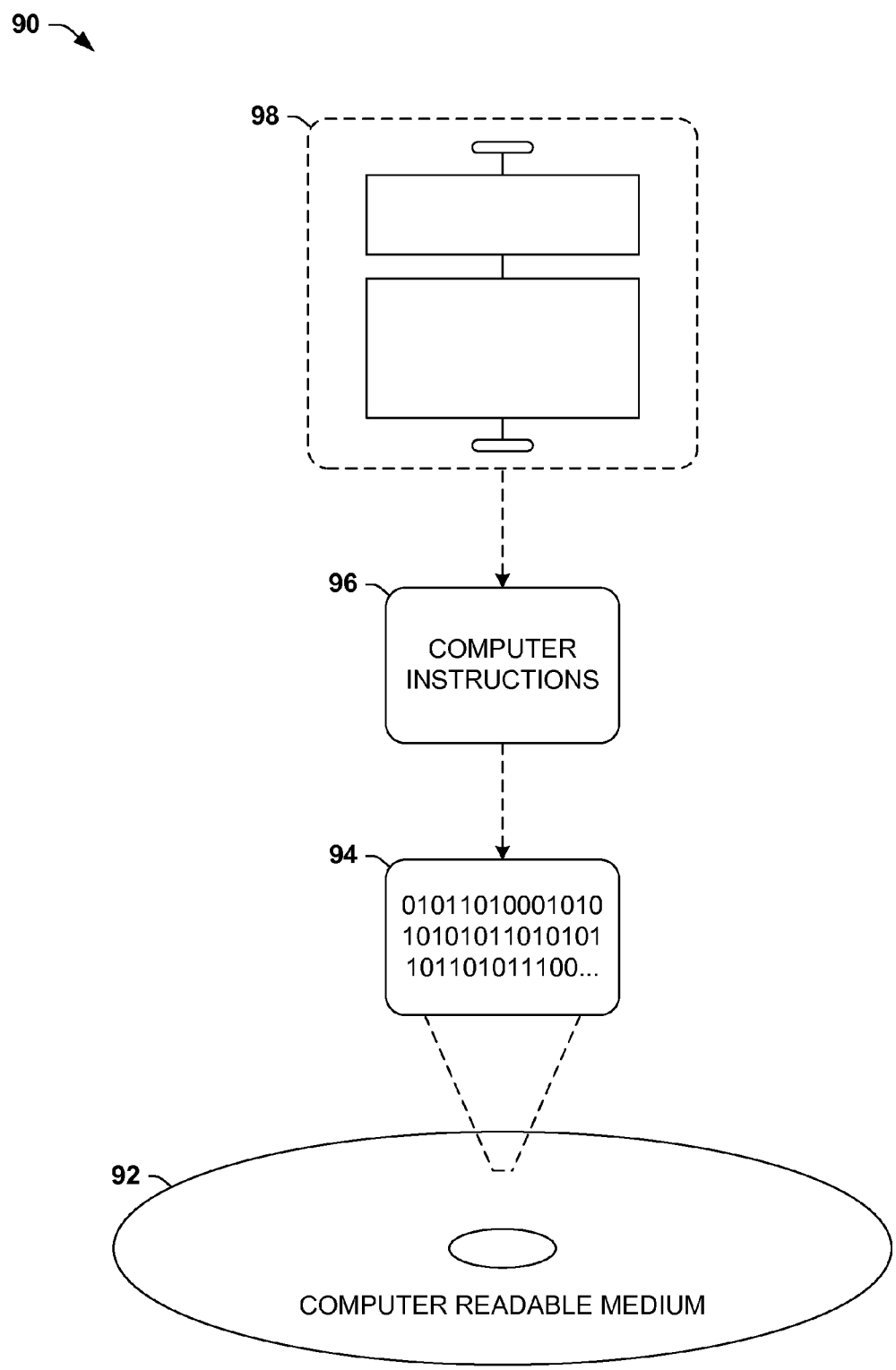
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of generating a zip archive comprising one or more compressed objects, such as the exemplary method 50 of FIG. 3. In another such embodiment, the processor-executable instructions 96 may be configured to implement a system for generating a zip archive comprising one or more compressed objects, such as the exemplary method 70 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary method 70 of FIG. 4) to confer individual and/or synergistic advantages upon such embodiments.

A first aspect that may vary among embodiments of these techniques relates to the scenarios wherein such techniques may be utilized. As a first variation, these techniques may be implemented in many types of zip archive generators 16 and/or zip archive extractors 18, including standalone executable binaries invoked by users and/or automated processes, an executable binary included with a zip archive 14 as a self-extracting zip archive 14, a storage system such as a file system or a database system, a server such as a webserver or file server, media rendering applications, and an operating system component configured to compress objects stored on storage devices. As a second variation of this first aspect, many types of lossless and/or lossy compression techniques 20 may be utilized, where some compression techniques 20 may be more adept at compressing a particular type of data than other compression techniques 20. As a third variation of this first aspect, these techniques may be utilized to compress many types of objects 12 in a zip archive 14, including text documents, web documents, images, audio and video recordings, interpretable scripts, executable binaries, data objects, databases and database components, and other compressed archives. A particular type of object 12 that may be advantageously stored according to the techniques presented herein is a media object that is to be rendered in a streaming manner. In such scenarios, a user or application may often utilize seek operations to access different portions of the object 12; and as compared with sequential-access techniques (including the exemplary scenario 10 of FIG. 1), the random access enabled by the techniques presented herein may considerably improve the access rate for various portions (particularly latter portions) of an object 12. Those of ordinary skill in the art may devise many such scenarios wherein the techniques presented herein may be advantageously utilized.

A second aspect that may vary among embodiments of these techniques relates to the manner of specifying and using the block table 44 and of storing the block table 44 in the zip archive 14. As a first variation, and as illustrated in the exemplary scenario 40 of FIG. 2, the block table 44 may be appended to the central directory 30 as a zip extension 48, which may be advantageous, e.g., for preserving the backwards compatibility of the zip archive 14 (such that zip archive compressors 16 and/or zip archive extractors 18 that do not implement the techniques presented herein may nevertheless utilize the zip archive 14). However, part or all of the block table 44 may be stored in many other locations within the zip archive 14, including the local headers 26 of the compressed objects 28 and/or the central headers 32 within the central directory 30.

As a second variation of this second aspect, the section size 42, indicating the size of the section 22 of the object 12 that is compressed into each block 24 of the compressed object 28, may be specified within the block table 44.

Alternatively, the sizes of the sections 22 may be specified elsewhere in the zip archive 42, and/or may be omitted from the zip archive 42. For example, an embodiment of these techniques, or the compression algorithm 20 used to generate the blocks 24, may always use a standard section size 42, and specifying the section size 42 within the zip archive 14 may be superfluous.

As a third variation of this second aspect, the manner of specifying in the block table 44 the block sizes 46 of blocks 24 of various compressed objects 28 may be achieved in many ways. As one such example, the block table 44 may specify a particular compression technique 20, and may then specify the block sizes 46 of the blocks 24 of all compressed objects 28 within the zip archive 14 that are compressed with the compression technique 20. Moreover, the objects 12 may be stored in the zip archive 14 in a particular object order, and the block table 44 may specify the block sizes 46 of the blocks 24 of the compressed objects 14 according to the object order. This example may be advantageous, e.g., to promote the storage of the block sizes 46 in a compact and efficient manner that also enables a calculation of the address of the block 24 within the compressed object 28. Additionally, multiple compression techniques 20 may be included in the block table 46, which may include a series of sections for different compression techniques 20 and block sizes 46 of the compressed objects 28 stored in the zip archive 14 according to the compression technique 20.

Figure 6:
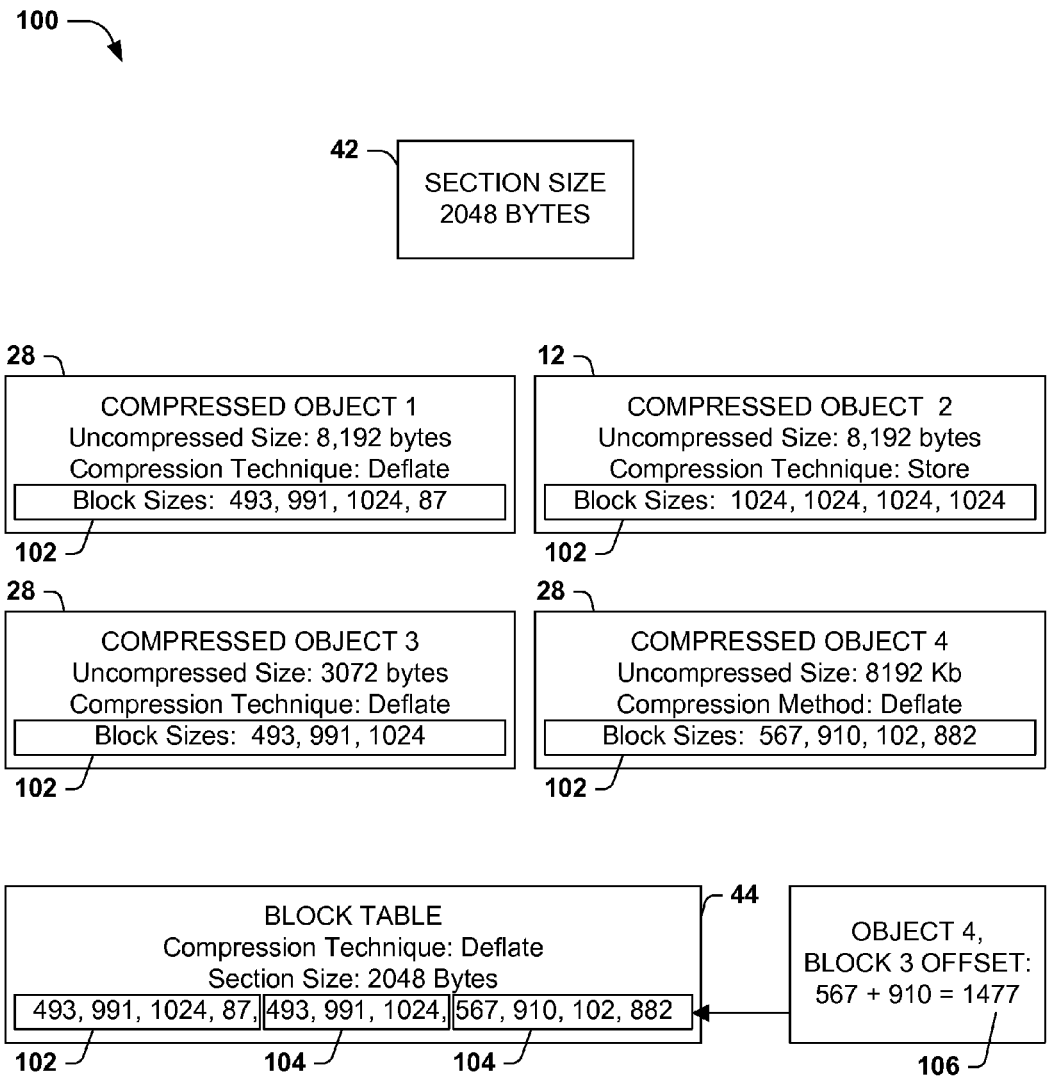
FIG. 6 is an illustration of an exemplary scenario featuring a calculation of a block address of a block using a block table among a set of objects compressed with a compression technique.

FIG. 6 presents an illustration of an exemplary scenario 100 featuring a block table 44 storing the block sizes 46 of the blocks 24 in accordance with this third variation of this second aspect. In this exemplary scenario 100, four objects 12 are included in the zip archive 14, and are stored in a particular object order. Moreover, the objects 12 are compressed in different ways; e.g., the first, third, and fourth objects 12 are stored according to a "Deflate" compression technique 20, while the second object 12 is simply stored in the zip archive 14 as an uncompressed object. Each compressed object 42 may therefore be associated with a particular block size sequence 102 specifying the block sizes 46 of the blocks 24 comprising the compressed object 28. The block table 44 may therefore specify the block sizes 46 of the blocks 24 in the following manner. First, the block table 44 may specify a particular compression technique 20, and the section size 42 selected for compressing the objects 14 according to the compression technique 20. Next, for each object 12 stored in the zip archive 14 that is compressed with the compression technique 20, the block table 44 may specify the block size sequence 102. In particular, the block table 44 may include a block size sequence 104 comprising a concatenation of the block size sequences 102 of the objects 12 compressed using the compression technique 20, in the same object order as the objects 12 are stored in the zip archive 14. For example, the block table 44 may specify, in order, the block size sequence 102 of the first compressed object 28, the third compressed object 28, and the fourth compressed object 28 (but not the second object 12, which is not compressed with the compression technique 20).

As further illustrated in FIG. 6, a zip archive extractor 18 may use this block table 44 to identify a block address of a selected block 24 of a selected object 12 in the reverse manner. First, using the central directory 30, the zip archive extractor 18 may identify the object order of the objects 12 stored in the zip archive 14 that are compressed with the compression technique 20, and may also record the uncompressed sizes of the objects 12 stored in the central headers 32. For each preceding object 12 that precedes the selected object 12 in the zip archive 14, within the block size sequence 104 stored in the block table 44, the zip archive extractor 18 may advance past the block size sequence 102 for the preceding object 12. This may be achieved, e.g., by calculating a block size count for the preceding object 12 according to the uncompressed size of the preceding object 12 (according to the central header 32) divided by the section size 42, and by advancing past a number of block sizes 24 in the block size sequence 104 matching the block size count. At the end of this advancing, the zip archive extractor 18 may have identified the block size 46 within the block size sequence 104 of the block table 44 for the first block 24 in the compressed object 28. The zip archive extractor 18 may then calculate the block offset 106 of the selected block 24 within the compressed data of the compressed object 28 by, in the block size sequence 102 for the compressed object 28 stored at the current point in the block size sequence 102 of the block table 44, adding the block sizes 46 of the blocks 24 preceding the selected block 24 to calculate the block offset 106 of the selected block 24. The zip archive extractor 18 may then seek within the zip archive 14 to the local header address 34 of the local header 26 of the compressed object 28, advance to the start address 36 of the compressed data, and advance further to the block offset 106 of the selected block 24 within the compressed object 28. In this manner, the zip archive extractor 18 may utilize the block table 44 to identify the block address of the selected block 24 within the compressed object 28 stored in the zip archive 14. However, those of ordinary skill in the art may devise many ways of generating, storing, and using the block table 44 of a zip archive 24 in accordance with the techniques presented herein.

A third aspect that may vary among embodiments of these techniques relates to the manner of compressing and/or expanding objects 12 included in a zip archive 14 in view of the techniques presented herein. As a first variation of this third aspect, the section size 42 may be designated in many ways, such as by the compression technique 20, or by a user or automated process requesting the generation of the zip archive 14. Alternatively, a standard section size 42 may be selected by default (e.g., a 64-kilobyte block size), and may therefore be used by default by the zip archive compressor 16 and/or the zip archive extractor 18.

As a second variation of this third aspect, some compression techniques 20 may utilize referencing among compressed portions to achieve a higher compression ratio and/or efficiency. For example, a compression technique 20 may compress a first portion of an object 12 to generate a block 24 that involves particular characteristics, such as a dictionary that may be used to translate particular compressed portions into uncompressed portions that appear frequently within the object 12. In compressing a second portion of the object 12, the compression technique 20 may discover that some of the same characteristics are involve; e.g., if the second compressed portion is identical or similar to the first compressed portion, the same dictionary may be used in the compression. However, this feature of the compression technique 20 may create inefficiency in the random accessing of the object 12. For example, if a first block 24 in the compressed object 28 is referenced by each of second block 24, a third block 24, and a fourth block 24, then individual, random accesses to each of these blocks 24 also involve accessing the first block 24 (e.g., the compression technique 20 may discover the referencing while endeavoring to expand each block 20), thereby causing another random access to the first block 24 and diminishing the throughput of the random access. Accordingly, an embodiment of the techniques presented herein may, for objects 14 represented in the bock table 44, instruct the compression technique 20 to disable the referencing feature of the compression technique. More particularly, the embodiment may be able to instruct the compression technique 20 to disable referencing between a first compressed portion and a second compressed portion that appear in different blocks 24, since compressed portions that appear in the same block 24 are retrieved together within the same block 24 and do not disrupt random access. This disabling may lead to a less efficient compression, but may promote the random accessing of each block 24.

As a third variation of this third aspect, the expansion and accessing of a compressed object 28 may occur in response to a request to access a particular object portion. However, the requested object portion may not precisely match the boundaries of a section 22 of the object 12, but may begin and/or end on a different boundary of the section 22 (e.g., falling entirely within a section 22, or overlapping two or more sections 22). Because the randomly accessible blocks 24 does not enable per-bit indexing into the blocks 24 of the compressed object 28, some additional reading and expansion of extraneous data may have to be involved. However, the random accessibility of the blocks 24 of the compressed object 28 may reduce the extraneous data to a trivial amount of data, particularly as smaller section sizes 42 are utilized. In order to provide the selected portion of the object 12, an embodiment of these techniques may identify the sections 22 of the object 12 covering the selected portion, and, utilizing the techniques presented herein, read and expand the blocks 24 of the compressed object 28 corresponding to such sections 22. After expanding these blocks 24, the embodiment may then trim the sections 22 to generate the selected portion, and may then provide the selected portion to fulfill the request. Thus, the extraneously processed data is less than twice the section size 42, and may be reduced by reducing the section sizes 42 utilized to compress the objects 12.

As a fourth variation of this third aspect, in order to access the compressed data (beginning at a start address 36) for a compressed object 28 stored in the zip archive 14, a zip file extractor 18 may first identify the central header 32 for the compressed object 28 in the central directory 30, read from the central header 32 the local header address 34 of the local header 26 for the compressed object 28, may seek within the zip archive 14 to the local header address 34, and then advance past the local header 26 to the start address 36 of the compressed data. For many compressed objects 28, this manner of seeking to the compressed data of the compressed object 28 may be marginally inefficient, because the size of the information typically contained in the local header 26 is fixed. However, a zip file extractor 18 cannot simply seek within the zip archive 14 to the local header address 34 plus the fixed size of the local header 26, because the local header 26 may include one or more zip extensions 48 (which may be generated by the techniques presented herein or by any other techniques), and it may only be possible to identify the presence, number, and respective sizes of the zip extensions 48 by seeking to the local header address 34 and advancing past the local header 26. Instead, in accordance with this fourth variation, a zip file generator 16 may store in the central header 32 of the compressed object 28 (e.g., within yet another zip extension 48) a block jump, which may indicate the total zip extension sizes of zip extensions 48 included in the local header 26 of the compressed object 28. A zip archive extractor 18 may then utilize this information to calculate the start address 36 of the compressed data of a compressed object 28 by adding the local header address 34, the fixed size of the local header 26, and the value included in the block jump, and may directly seek within the zip archive 14 to this start address 36 in order to begin reading the compressed data. Moreover, this calculation may also include the calculation of the block address of the selected block 24 (e.g., as in the exemplary scenario 100 of FIG. 6), enabling the zip archive extractor 18 to seek within the zip archive 14 from the central header 32 of a compressed object 28 directly to the selected block 24. These variations may therefore reduce the number of seeks within the zip archive 14 involved in reaching the compressed data of a selected block 24 and improving the efficiency and speed of the zip archive extractor 18.

Figure 7:
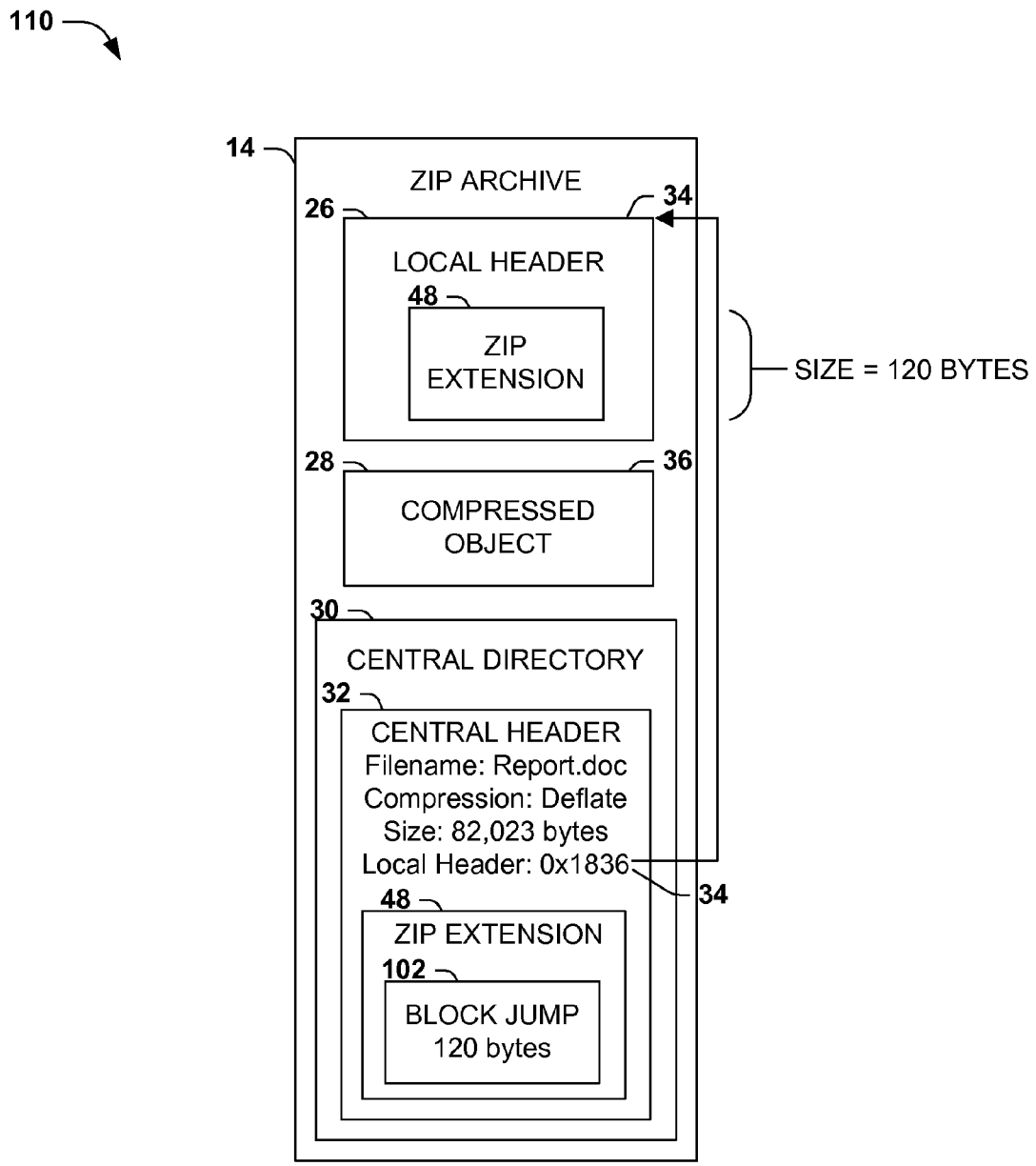
FIG. 7 is an illustration of an exemplary scenario featuring a block jump zip extension included in a central header of a zip archive.

FIG. 7 presents an exemplary scenario 110 featuring the inclusion of a block jump 102 according to this fourth variation. In this exemplary scenario 110, a zip archive 14 stores an object 12 as a local header 26 stored at a local header address 34 followed by the compressed object 28, and also includes a central directory 30 featuring a central header 32 for the compressed object 28 specifying the local header address 34. However, a zip archive extractor 18 may not be able to use this information alone to locate the start address 36 of the compressed object 28, because the local header 26 may include a zip extension 48 of a particular size. In order to expedite the accessing of the compressed data of the compressed object 28, a zip archive generator 16 may store in the central header 32 for the compressed object 28 a zip extension 48 including a block jump 102 specifying a local header size (e.g., the size of the zip extension 48 stored in the local header 26 of the compressed object 28). A zip archive extractor may utilize this information to calculate the start address 36 of the compressed data of the compressed object 28 as the sum of the local header address 34, the fixed size of the local header 26, and the value indicated in the block jump 102, and may therefore seek to and access the compressed data of the compressed object 28 without having to seek to and advance past the local header 26. Those of ordinary skill in the art may devise many ways of adjusting the compression and expansion of the objects 12 and compressed objects 28 in accordance with the techniques presented herein.

A fourth aspect that may vary among embodiments of these techniques relates to the storage in the zip archive 14 of uncompressed objects 12. Some objects 12 to be stored in the zip archive 14 may not be advantageously compressed with the compression technique 20, such as objects 12 that have already been compressed. In order to store this object 12 in the zip archive 14, a zip archive generator 16 may simply store a local header 26 and the sections 22 of the object 12. This object 12 may still be accessed in a random access manner using the same techniques presented herein, e.g., by denoting the absence of a compression technique 20 and then denoting the block sizes 46 of the blocks 24 (which may, e.g., correspond directly to the section size 42, as illustrated for the second object 12 in the exemplary scenario 100 of FIG. 6). While this manner of randomly accessing the sections 22 of the uncompressed object 12 may be marginally inefficient, it may be advantageous to utilize the same technique for randomly accessing uncompressed objects 12 as for accessing compressed objects 28.

As a variation of this fourth aspect, in some scenarios, it may be advantageous to align the start address 32 of an uncompressed object 12 stored in the zip archive 14 according to an address alignment. As one such scenario, a zip file extractor 16 may be able to recognize particular uncompressed objects 18 if stored with a start address 32 beginning at a particular interval (e.g., aligned to a 16 kb address). In such scenarios, the start address 36 of an uncompressed object 12 may be aligned according to an address alignment by including, in the local header 26 of the object 12, a zip extension 48 comprising buffer of a particular buffer size, which may displace the start address 36 of the object 12 to a desired address that satisfies the address alignment.

The inclusion of a buffer to achieve the alignment of the start address 36 may present some advantages, but also increases the size of the zip archive 14. In some cases, this increase may be significant; e.g., if an address alignment of sixty-four kilobytes (65,536 bytes) is specified, but if an object 12 misses the address alignment by one byte, a buffer of 65,535 bytes may have to be inserted into the local header 26 to achieve an address alignment of the object 12 with the next 64 kb-aligned address. Instead, and as a further variation of this fourth aspect, the order of objects 12 stored in the zip archive 14 may be selected in a manner that reduces the buffer sizes of the buffers. For example, a zip archive generator 16 may consider the sizes of all objects 14 (compressed and uncompressed) stored in the zip archive 14 and the addresses satisfying the address alignment, and may apply a best-fit technique in order to select an ordering of objects 12 that reduces the buffer sizes of the buffers. In this manner, the buffering of the objects 12 to satisfy an address alignment may be achieved while reducing the total sizes of the buffers so utilized and the resulting expansion of the zip archive 14.

Figure 8:
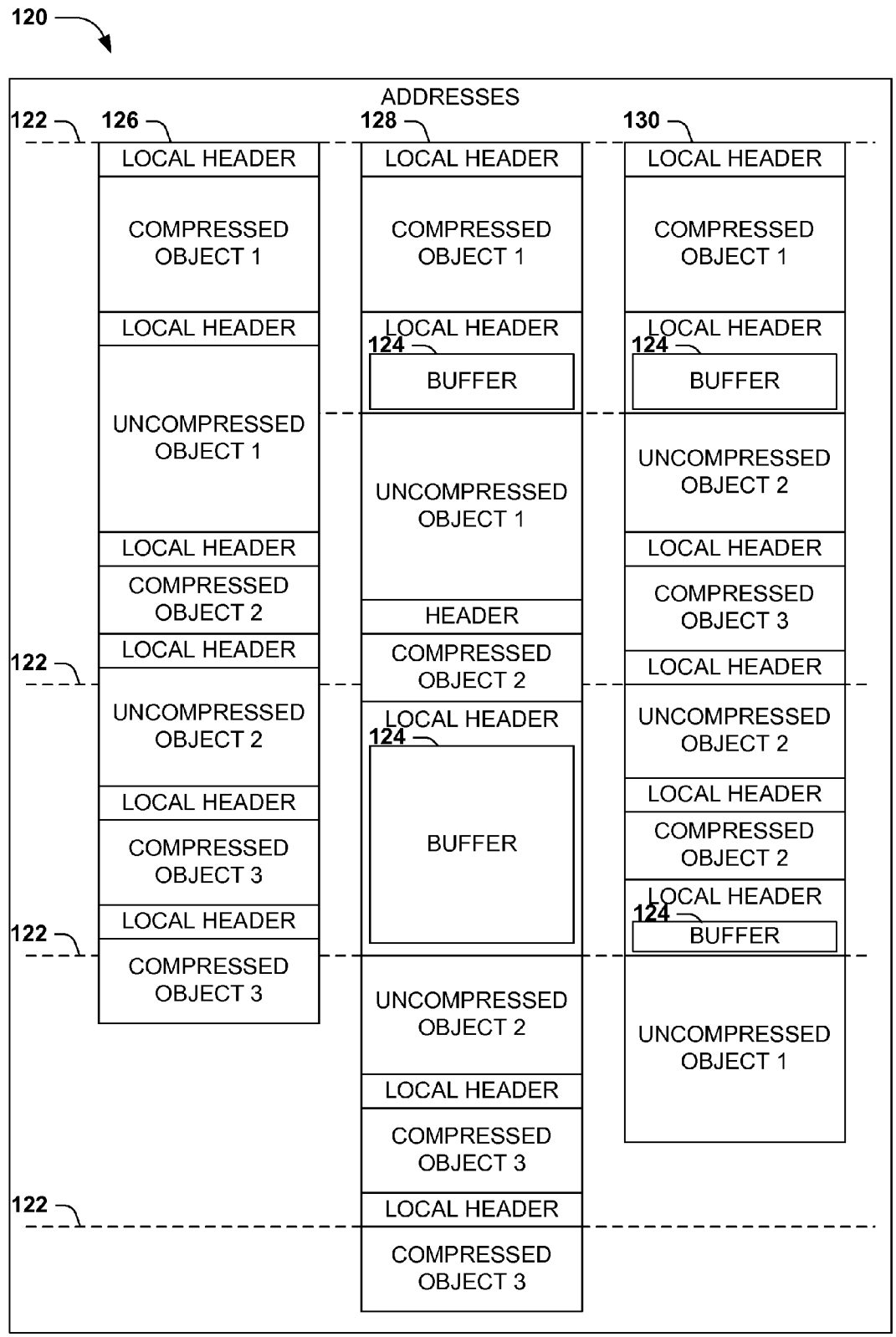
FIG. 8 is an illustration of an exemplary scenario featuring an address alignment and reordering of compressed objects in a zip archive.

FIG. 8 presents an illustration of an exemplary scenario 120 featuring the use of buffering and the selective ordering of objects 12 in the zip archive 12 to achieve an address alignment. In this exemplary scenario 120, six objects 12 are stored in the zip archive 14, comprising three compressed objects 28 and three uncompressed objects 12. In a first object ordering 126 of objects 12 in the zip archive 14, the objects 12 may be stored in any order, and with starting addresses 36 appearing any location within the zip archive 14. However, while the compressed objects 28 may have any start address 36, it may be desirable to store three uncompressed objects 12 with a starting address 36 matching a particular alignment boundary 122 satisfying an address alignment (e.g., 64 kb boundaries within the zip archive 14). Accordingly, in a second object ordering 128, the local header 26 of each uncompressed object 12 may include (within a zip extension 48) a buffer 124 having a buffer size that displaces the start address 36 of the uncompressed object 12 to the next alignment boundary 122. While this buffering may achieve an advantageous address alignment, the size of the zip archive 14 may be considerably increased (e.g., due to the large buffer 124 included in the local header 26 preceding the second uncompressed object 12). Therefore, the order of the objects 12 stored in the zip archive 14 may be selected to reduce the buffer sizes of the buffers 124. For example, the third object ordering 130 also inserts buffers 124 into the local headers 26 of the uncompressed objects 12 to achieve an address alignment, but the object order of the objects 12 within the zip archive 14 is adjusted (e.g., by selecting the object order according to a best-fit technique) such that the buffer sizes of the buffers 124 are reduced. While a zip archive 14 featuring third object ordering 130 is still larger than a zip archive 14 featuring the first object ordering 126, it is significantly smaller than a zip archive 14 featuring the second object ordering 128, and also achieves the address alignment of the uncompressed objects 12. Those of ordinary skill in the art may devise many ways of storing uncompressed objects 12 in the zip archive 14 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
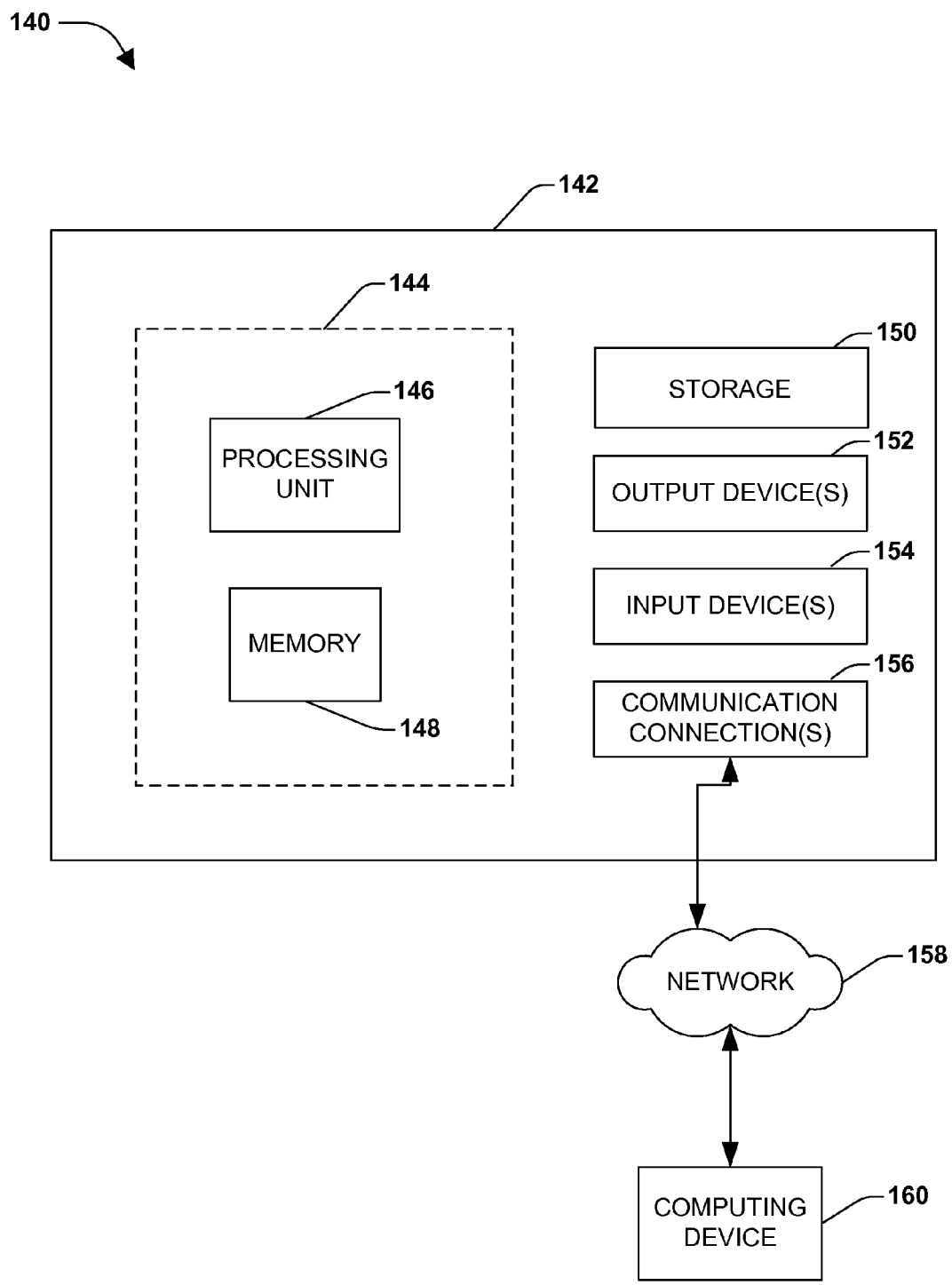
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 9 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 9 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of generating an archive compressing at least one object comprising sections of a section size on a device having a processor and a compression technique, the method comprising:
 executing, on the processor, instructions that cause the device to:
  for respective objects, using the compression technique, compress the object from the sections of the section size into blocks respectively having a block size, the blocks including a first block having a first block size and a second block having a second block size that is different from the first block size; and
  generate an archive comprising:
   the blocks of the respective objects; and
   a block table specifying, for the respective blocks of the respective objects compressed with the compression technique, the block size of the block corresponding to the section of the object of the section size; and
  responsive to a streaming access request to stream a selected object of the object set from an uncompressed start location that is beyond a beginning of the selected object:
   identify a selected block of the object that corresponds to the section of the object that includes the uncompressed start location;
   using the block map, identify a compressed start location of the selected block within the archive;
   seek within the archive to the compressed start location of the selected block as a current block; and
   incrementally stream the object by:
    reading the current block of the block size as indicated by the block map;
    uncompressing the block with the compression technique to produce the section of the object;
    inserting the section into the stream; and
    advancing within the archive by the block size of the current block as indicated by the block map.

2. The method of claim 1, wherein the block table further specifies the section size.

3. The method of claim 2, wherein the section size is determined by the compression technique.

4. The method of claim 2, wherein the section size is specified by a user generating the archive.

5. The method of claim 1, wherein:
 the archive storing objects are compressed with the compression technique in an object order; and
 the block table specifies the block sizes of the blocks of the objects according to the object order.

6. The method of claim 1, wherein the central directory further comprises a central header for an object including a block jump specifying an extension size of an extension stored in the local header of the object.

7. The method of claim 1, wherein:
 the objects are stored in the archive comprising at least one uncompressed object that is not compressed with the compression technique; and
 generating the archive further comprises: for respective uncompressed objects, storing a local header and the sections of the uncompressed object.

8. The method of claim 7, wherein executing the instructions further causes the device to include in a local header of the uncompressed object an extension comprising a buffer of a buffer size selected to align a start address of the blocks according to an address alignment.

9. The method of claim 8, wherein the archive storing objects in an object order selected to reduce the buffer sizes of the buffers for the uncompressed objects.

10. The method of claim 9, wherein the object order selected according to a best-fit technique.

11. The method of claim 1, wherein:
 the compression technique includes a referencing of a first compressed portion to a second compressed portion; and
 executing the instructions further causes the device to disable the referencing of the compression technique for objects represented in the block table.

12. The method of claim 11, wherein disabling the referencing further comprises: disabling referencing of the object for a first compressed portion located in a different block than the second compressed portion.

13. A method of fulfilling a request to stream an object, the method performed on a device having a processor and comprising:
 executing, on the processor, instructions that cause the device to:
  access an archive comprising the object compressed with a compression technique, the archive comprising:
   a set of blocks comprising the object, wherein respective sections of the object having a section size have been compressed using the compression technique into a block having a block size, wherein the blocks of the object include a first block having a first block size and a second block having a second block size that is different from the first block size; and
   a block table specifying, for the respective blocks of the respective objects compressed with the compression technique, the block size of the block corresponding to the section of the object of the section size; and
  responsive to a streaming access request to stream the object from an uncompressed start location that is beyond a beginning of the object;
  using the block map:
   identify a selected block of the object that corresponds to the section of the object that includes the uncompressed start location; and
   identify a compressed start location of the selected block within the archive;
  seek within the archive to the compressed start location of the selected block as a current block; and
  incrementally stream the object by:
   reading the current block of the block size as indicated by the block map;
   uncompressing the block with the compression technique to produce the section of the object;
   inserting the section into the stream; and
   advancing within the archive by the block size of the current block as indicated by the block map.

14. The method of claim 13, wherein:
 the request specifies a selected portion within at least one selected section of the object;

reading the selected block further comprises: reading the at least one selected block of the object corresponding to the at least one selected section;

expanding the selected block further comprises: using the compression technique, expanding the at least one selected block to generate at least one selected section;

executing the instructions further causes the device to trim the at least one selected section to generate the selected portion; and providing the selected section further comprises: providing the selected portion to fulfill the request.

15. The method of claim 13, wherein:

the archive storing objects are compressed with the compression technique in an object order;

the block table further specifies the block sizes of the blocks of the objects as a block size sequence according to the object order; and identifying the block address of the selected block further comprises:

using the central directory of the archive, identifying the objects of the archive that are compressed with the compression technique;

within the block size sequence of the block table, advancing past the block sizes specified for at least one preceding object that precedes the object, according to the object order, to a block size sequence address specifying the block sizes for the object; and beginning at the block size sequence address within the block size sequence, adding the block sizes of the blocks preceding the selected block to calculate the block address of the selected block.

16. The method of claim 15, wherein advancing past the block sizes specified for a preceding object further comprises:

calculating a block size count for the preceding object according to an uncompressed size of the preceding object and the section size; and within the block size sequence, advancing past a number of block sizes matching the block size count.

17. The method of claim 13, wherein:

the local header of at least one object further comprises an extension having an extension size;

the central directory of the archive further comprises a central header for the at least one object including a block jump specifying the extension size of the extension within the local header of the object; and identifying the block address further comprises:

reading the block jump in the central header for the at least one object, and adding the block jump to the block address.

18. A device that provides streaming access within an archive compressing at least one object comprising sections of a section size on a device having a processor and a compression technique, the device comprising:

a processor; and a memory storing instructions that, when executed by the processor, cause the device to:

for respective objects, using the compression technique, compress the object from the sections of the section size into blocks respectively having a block size, the blocks including a first block having a first block size and a second block having a second block size that is different from the first block size; and generate an archive comprising:

the blocks of the respective objects; and a block table specifying, for the respective blocks of the respective objects compressed with the compression technique, the block size of the block corresponding to the section of the object of the section size; and respond to a streaming access request to stream a selected object of the object set from an uncompressed start location that is beyond a beginning of the selected object by:

identifying a selected block of the object that corresponds to the section of the object that includes the uncompressed start location;

using the block map, identifying a compressed start location of the selected block within the archive;

seeking within the archive to the compressed start location of the selected block as a current block; and incrementally streaming the object by:

reading the current block of the block size as indicated by the block map;

uncompressing the block with the compression technique to produce the section of the object;

inserting the section into the stream; and advancing within the archive by the block size of the current block as indicated by the block map.

19. The device of 22, wherein executing the instructions further causes the device to fulfill a request to read at least one selected section of a selected object by:

using the central directory of the archive, identify a start address of the selected object within the archive;

for respective selected sections of the selected object:

using the block table stored in the extension of the central directory of the archive, identifying, relative to the start address, a block offset of the block of the archive that corresponds to the selected section;

identifying a block address of the block within the archive according to the start address of the object and the block offset;

reading the block of the selected object at the block address; and using the compression technique, expanding the block to generate the selected section; and providing the at least one selected section to fulfill the request.

20. The method of claim 1, wherein executing the instructions further causes the device to fulfill a random access request to a requested portion within a selected object of the object set, wherein the requested portion is beyond a beginning of the selected object, by:

using the block table:

identifying a start address of the selected object within the archive;

identifying selected blocks corresponding to the selected segments of the selected object; and identifying a start address within the archive corresponding to the beginning of the selected object;

seeking within the archive to the block location of the selected block;

using the compression technique, expanding the selected block at the block location within the selected object to generate the requested portion of the selected object; and providing the requested portion of the selected object to fulfill the random access request.

* * * * *